Jan. 15, 1952  S. J. SMITH  2,582,400
CAPACITANCE TYPE LIQUID QUANTITY GAUGE
Filed Jan. 31, 1949
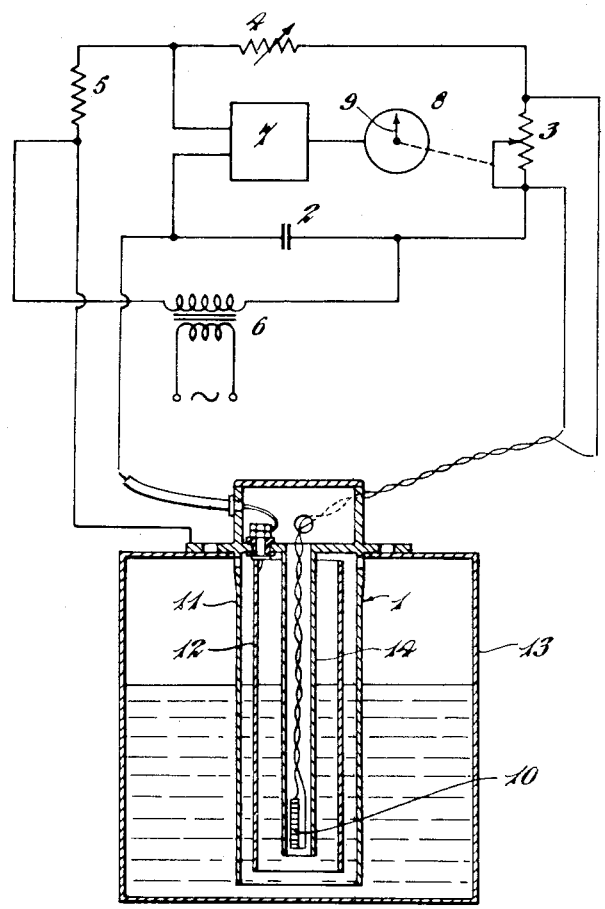
Inventor
Stanley James Smith
By: Watson, Cole, Grindle & Watson
Attorneys Patented Jan. 15, 1952

2,582,400

UNITED STATES PATENT OFFICE 2,582,400

CAPACITANCE TYPE LIQUID QUANTITY GAUGE

Stanley James Smith, Ossining, N. Y.

Application January 31, 1949, Serial No. 73,813

3 Claims. (Cl. 73—304)

1

This invention relates to liquid quantity gauges of the kind in which the electrodes of a capacitor are arranged within the container for the liquid in such manner that as the quantity of the liquid in the container changes the proportion of air to liquid as the dielectric of the capacitor and hence its capacitance changes.

In many cases it is preferred that the measurement of liquid quantity shall be in terms of the mass of liquid, and if liquid quantity is indicated in proportion to change of capacitance this result may be substantially achieved since although the volume of liquid will change with change of temperature, the dielectric constant of the liquid, in the case of liquids such as are used as fuel for aircraft engines, will also change so as to offset the change in volume. However, this compensation is not complete and for a temperature range of from $-50°$ C. to $+70°$ C., such as may be encountered in aircraft, there will be a residual error of some four percent which cannot usually be tolerated.

In the case where change is capacitance is indicated by means of a pointer instrument such as a moving coil milliammeter correction for this error may be obtained as described in the specification of my co-pending application for Letters Patent Serial No. 72,913, filed January 26, 1949, by shunting the instrument with a resistor having a large temperature coefficient so that the sensitivity of the instrument is varied as the temperature changes, the resistor being positioned in close proximity to the capacitor in the liquid container.

In the case of liquid quantity gauge systems of the kind in which measurement is effected by a self-balancing bridge arrangement which operates automatically to balance the capacitance of the capacitor in the liquid container against a fixed impedance, indication being given by observation of the movement of the device which adjusts the balancing arm of the bridge, such compensation cannot easily be provided since modification of the reading must be effected in such manner that such modification is directly proportional to the scale reading and is not a constant percentage of the full scale. If the temperature sensitive resistor is located in one of the bridge arms the degree of unbalance introduced will be constant for all readings while it cannot be applied to provide correction at the indicator or intermediate device since under balanced conditions no current flows in these circuits.

The present invention accordingly has for its object the provision of compensation for error in

2 accuracy of indication of liquid mass due to temperature changes in a liquid quantity gauge system of the kind in which measurement is effected by a self-balancing bridge arrangement.

Other objects and advantages of the invention will be apparent from the following description of a liquid quantity gauge system in conjunction with the accompanying drawing in which the sole figure shows diagrammatically a wiring diagram of one form of a self-balancing bridge type of system in conjunction with a liquid container and capacitance type gauge, shown in transverse section.

As shown in the drawing the bridge comprises a capacitor 1 arranged in the liquid container 13 and comprising the electrodes 11, 12, a fixed capacitor 2, the resistors 3 and 4, and the resistor 5. Current from a suitable source of alternating current having a frequency of say 400 cycles is applied through transformer 6 to the bridge between the join of resistor 5 and capacitor 1 and the join of resistor 3 and capacitor 2 while an amplifier 7 is connected between the join of the resistors 4 and 5 and the join of the capacitors 1 and 2. The output of the amplifier 7 is applied to operate a motor 8 which operates an indicating pointer 9 and simultaneously adjusts the magnitude of the resistor 3.

The construction and operation of amplifier 7 and motor 8 will be familiar to those skilled in the art and it is sufficient to mention that in operation if the bridge is unbalanced the resultant input to the amplifier 7 will cause the motor 8 to operate to vary the magnitude of the resistor 3 in such sense as to re-balance the bridge. Accordingly as the magnitude of the capacitor 1 varies due to change of liquid quantity the position of the pointer 9 driven by the motor 8 will vary in proportion and hence will indicate liquid quantity. The resistor 4 is provided to enable adjustment of the resistor 3 to be obtained so that a full scale movement of the pointer 9 corresponds to a change of liquid quantity between maximum and minimum.

According to the present invention the operation of the arrangement is compensated for errors due to temperature changes by providing a resistor 10 which is connected in shunt with the adjustable resistor 3 and which is constructed of material having a high temperature coefficient of resistance. This resistor 10 is positioned in the liquid container adjacent the capacitor 1 where it can assume the temperature of the liquid and in the arrangement illustrated in the drawing resistor 10 is housed within a tube 14 that extends within inner electrode 12 of capacitor 1 and that is closed at its lower end. The magnitude of resistor 10 and the magnitude of resistor 3 are made such that the change in resistance of resistor 10 over a temperature range of from −50° to +70° C. will cause a 4% change in the setting of the resistor 3 at the "full" position.

When the resistor 3 is set to zero by the action of the motor 8 the temperature sensitive resistor 10 will have no effect while as the value of resistor 3 is increased the compensating effect of resistor 10 will increase until at maximum value of resistor 3 the effect will be a maximum. The compensation is not strictly linear but the deviation from linearity for a four percent correction is less than 1%, which error occurs at a low value of resistor 3 where its effects are very small and difficult to detect.

I claim:

1. A liquid quantity gauge comprising a bridge network, a condenser positioned in a container for liquid and varying in capacity with the depth of the liquid, said condenser being connected in one arm of the bridge network, an adjustable resistor connected in another arm of the bridge network, means responsive to variation in capacity of said condenser for adjusting said resistor to restore balance to said network, and means compensating for the effects of temperature changes, said last named means comprising a second resistor subjected to the same temperature as said condenser and having a large temperature coefficient of resistance, said second resistor being positioned in said container and connected in shunt with said adjustable resistor.

2. An indicating arrangement comprising a a large temperature coefficient of resistance, said self-balancing bridge network, a condenser having a capacity which varies in proportion to the quantity to be indicated, said condenser being connected in one arm of the bridge network, an adjustable resistor connected in another arm of the bridge network, means responsive to variation in magnitude of said condenser for adjusting said resistor to restore bridge balance to said network, and means compensating for the effects of temperature changes, said last named means comprising a second resistor subjected to the same temperature as said condenser and having a large temperature coefficient of resistance, said second resistor being connected in shunt with said adjustable resistor.

3. A liquid quantity gauge comprising a bridge network, a condenser positioned in a container for liquid and varying in capacity with the depth of the liquid, said condenser being connected in one arm of the bridge network, an adjustable resistor connected in another arm of the bridge network, means responsive to variation in capacity of said condenser for adjusting said resistor to restore balance to said network, said means including an amplifier energized by bridge imbalance, an indicating device, and a motor energized by said amplifier for driving said indicator and adjusting said resistor to restore bridge balance to said network, and means compensating for the effects of temperature changes, said last named means comprising a second resistor subjected to the same temperature as said condenser and having a large temperature coefficient of resistance, said second resistor being positioned in said container and connected in shunt with said adjustable resistor.

STANLEY JAMES SMITH.

REFERENCES CITED

The following references are of record in the file of this patent:

UNITED STATES PATENTS

| Number | Name | Date |
| --- | --- | --- |
| 2,188,628 | Freystedt | Jan. 30, 1940 |
| 2,362,661 | Peters et al. | Nov. 14, 1944 |
| 2,395,515 | Stoller | Feb. 26, 1946 |
| 2,409,073 | Sias et al. | Oct. 8, 1946 |
| 2,477,511 | Comb | July 26, 1949 |
| 2,540,658 | De Giers et al. | Feb. 6, 1951 |

FOREIGN PATENTS

| Number | Country | Date |
| --- | --- | --- |
| 129,741 | Great Britain | 1919 |
| 441,576 | Great Britain | Jan. 22, 1936 |